(No Model.)

M. J. DALRYMPLE.
PLOW ATTACHMENT.

No. 361,578. Patented Apr. 19, 1887.

Witnesses
F. L. Ourand
Benj. G. Cowl

Inventor
Milton Jay Dalrymple,
By his Attorneys
Louis Bagger & Co.

UNITED STATES PATENT OFFICE.

MILTON JAY DALRYMPLE, OF WAKEFIELD, KANSAS.

PLOW ATTACHMENT.

SPECIFICATION forming part of Letters Patent No. 361,578, dated April 19, 1887.

Application filed February 12, 1887. Serial No. 227,378. (No model.)

*To all whom it may concern:*

Be it known that I, MILTON JAY DALRYMPLE, a citizen of the United States, and a resident of Wakefield, in the county of Clay and State of Kansas, have invented certain new and useful Improvements in Corn-Plow Attachments; and I do hereby declare that the following is a full, clear, and exact description of the invention, which will enable others skilled in the art to which it appertains to make and use the same, reference being had to the accompanying drawings, which form a part of this specification, and in which—

Figure 1:
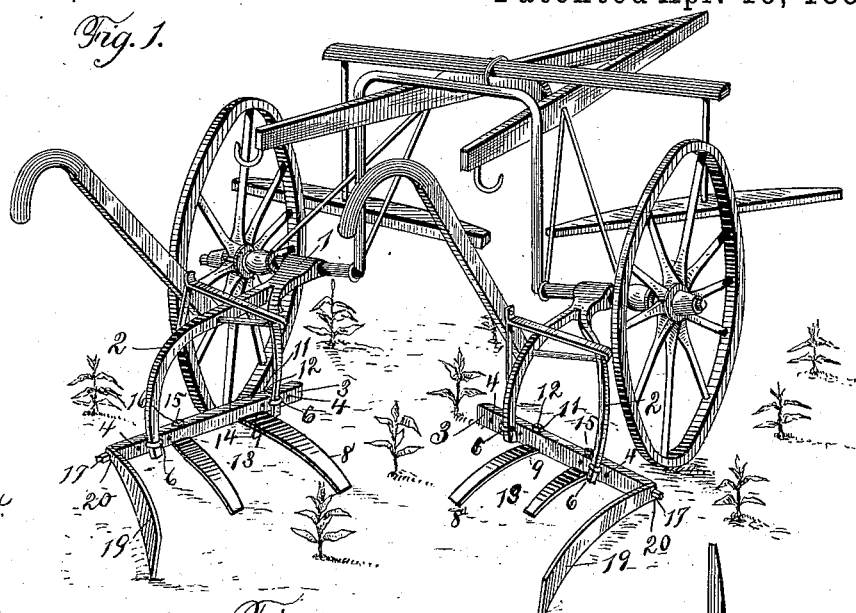
Figures 2, 3, 4:
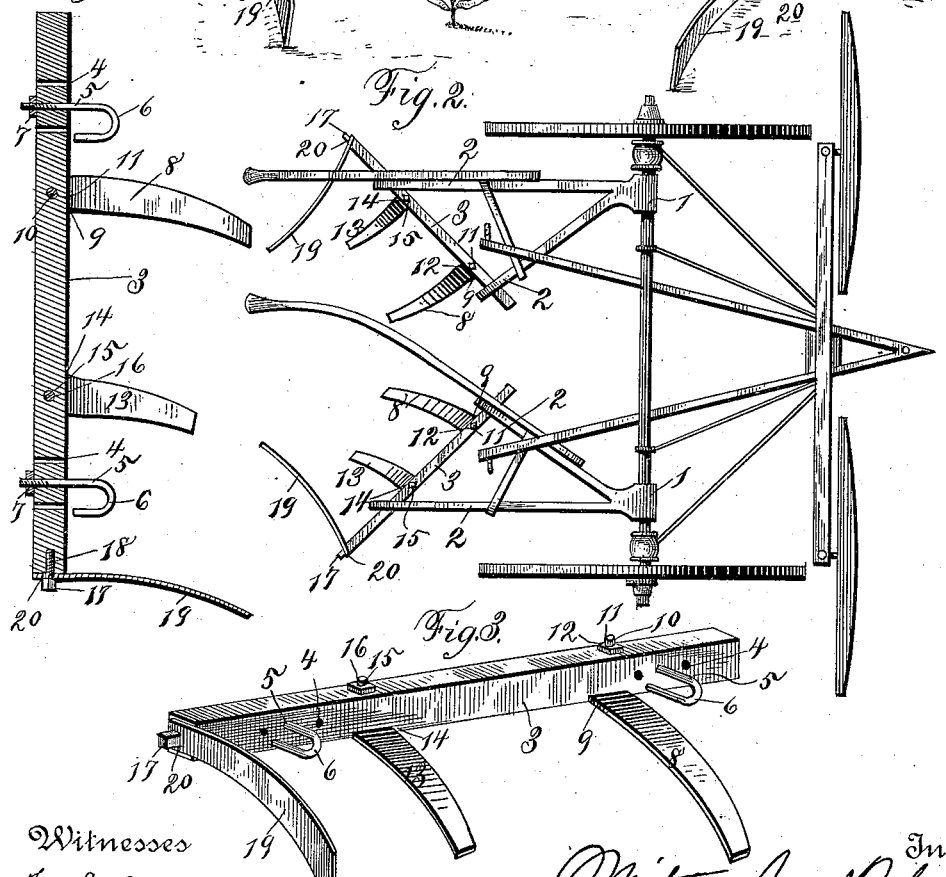

Figure 1 is a perspective view of a cultivator provided with my improved attachment. Fig. 2 is a top view of the same. Fig. 3 is a perspective view, on an enlarged scale, of the attachment; and Fig. 4 is a horizontal longitudinal sectional view of the bar of the attachment.

Similar numerals of reference indicate corresponding parts in all the figures.

My invention has relation to attachments for cultivators for cleaning the ground at the sides of rows of plants, and especially for cultivating corn drilled in rows; and it consists in the improved construction and combination of parts of such an attachment, as hereinafter more fully described and claimed.

In the accompanying drawings, the numerals 1 indicate the beams of a wheel-cultivator, and these beams are formed at their rear ends into standards 2, in the usual manner, and these parts may be of any suitable construction or shape, as the attachment is applicable to any cultivator.

Each attachment consists of a bar, 3, having two sets of perforations, 4, passing transversely through it, and bolts 5 pass through these perforations, one bolt for each set, and have hooks 6 formed at their outer ends, while nuts 7 fit upon the inner screw-threaded ends of the bolts, serving to draw the bolts inward. The bar is attached to the lower ends of the cultivator-standards, from which the blades or shovels have been removed, by means of the hooked bolts, each hook being passed around the lower end of the standard, and after being inserted into the suitable perforation of the set the hook is drawn inward by means of the nut upon the screw-threaded end of the bolt, causing the hook to clamp firmly around the end of the standard. A blade, 8, having a slightly-curved forward edge and having a slight downward curve, is secured with its inner end in a transverse groove, 9, in the forward end of the under side of the bar, a nutted bolt, 10, passing through a perforation, 11, in the bar, having the nut 12 bearing against the upper face of the bar. A similarly-shaped but shorter blade, 13, is secured with its inner end in a transverse groove, 14, in the under side of the bar, at the middle of the same, a nutted bolt, 15, passing through a perforation, 16, in the bar, and through the inner end of the blade, securing the same to the bar. A screw-threaded bolt, 17, is inserted into the rear end of the bar in a perforation, 18, and a rearwardly-curved blade, 19, is secured with a perforation, 20, in its end upon this bolt, projecting inward in the same direction as the curved blades secured upon the under side of the bar. It will now be seen that when two of these bars are secured by their hooked clamping-bolts to the lower ends of the standards of a straddle-row cultivator the forward ends of the bars will be converging, and the blades will project toward each other, the blades being secured in opposite positions to the two bars, and the longer forward blades will cut the weeds at the sides of the row, which will be in the middle between the bars, and the blades upon the middle of the bars will furthermore cut the weeds and stir the soil, while the rear curved blades, being secured to stand with their edges against the ground, will scrape the dirt toward the row, and at the same time, on account of the curve of their rear ends, allow sufficient of the soil to slip rearward between the rearwardly-curved ends to prevent the plants in the row from being covered and buried by the soil.

In this manner corn and other plants drilled in rows may have the ground at both sides of the rows cleaned from weeds, and may have the soil thrown toward the row without any danger of covering the plants in the row; and it will be seen that the attachment may be used with any construction of cultivator and with a cultivator of any size, as the bars are provided with two sets or series of perforations for the hooked bolts, so that the bolts may be adjusted in the perforations, in which they will register perfectly with the lower ends of the standards.

Having thus described my invention, I claim and desire to secure by Letters Patent of the United States—

1. In combination with a cultivator having downwardly-projecting standards, a bar having transverse perforations registering with the standards, hooked and nutted bolts in the perforations clamping the lower ends of the standards, a long curved blade secured upon the under side of the bar near the forward end, a shorter curved blade secured upon the middle of the under side, and a curved blade secured at its end to the rear end of the bar and projecting in the same direction as the other blades, as and for the purpose shown and set forth.

2. In combination with a straddle-row cultivator having downwardly-projecting standards, two bars having two sets of transverse perforations, and having two tranverse grooves in the under side and a screw-threaded perforation in the rear end, hooked bolts in the transverse perforations clamping the standards, and having nuts upon their inner ends, curved and inwardly-projecting blades secured by means of nutted bolts passing vertically through the bars in the forward grooves of the bars, similarly curved shorter blades secured by nutted bolts in the middle grooves, and curved blades secured by means of screw-threaded bolts to the rear ends of the bolts, having their rearwardly-curved ends projecting inward, as and for the purpose shown and set forth.

In testimony that I claim the foregoing as my own I have hereunto affixed my signature in presence of two witnesses.

MILTON JAY DALRYMPLE.

Witnesses:
 JOSEPH FRISHMAN,
 GEO. MURPHY.